No. 656,166. Patented Aug. 21, 1900.
H. BILGRAM.
MACHINE FOR CUTTING TEETH OF GEARED WHEELS.
(Application filed Dec. 27, 1898.)

(No Model.) 5 Sheets—Sheet 2.

WITNESSES:
J. Thompson
Henry R. Johnson

INVENTOR
Hugo Bilgram

No. 656,166. Patented Aug. 21, 1900.
H. BILGRAM.
MACHINE FOR CUTTING TEETH OF GEARED WHEELS.
(Application filed Dec. 27, 1898.)
(No Model.) 5 Sheets—Sheet 3.
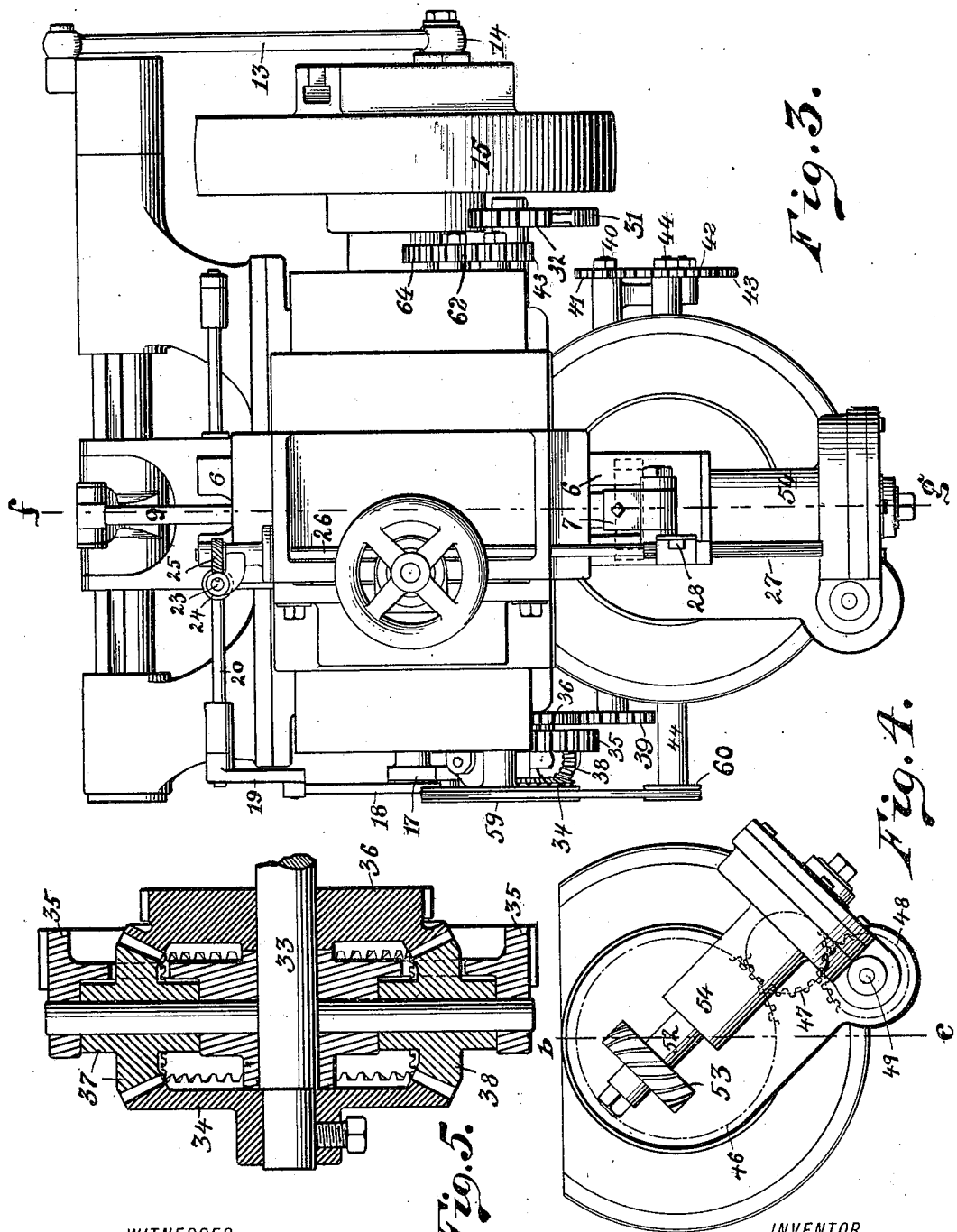
WITNESSES:
J. Thompson
Henry R. Johnson
INVENTOR
Hugo Bilgram

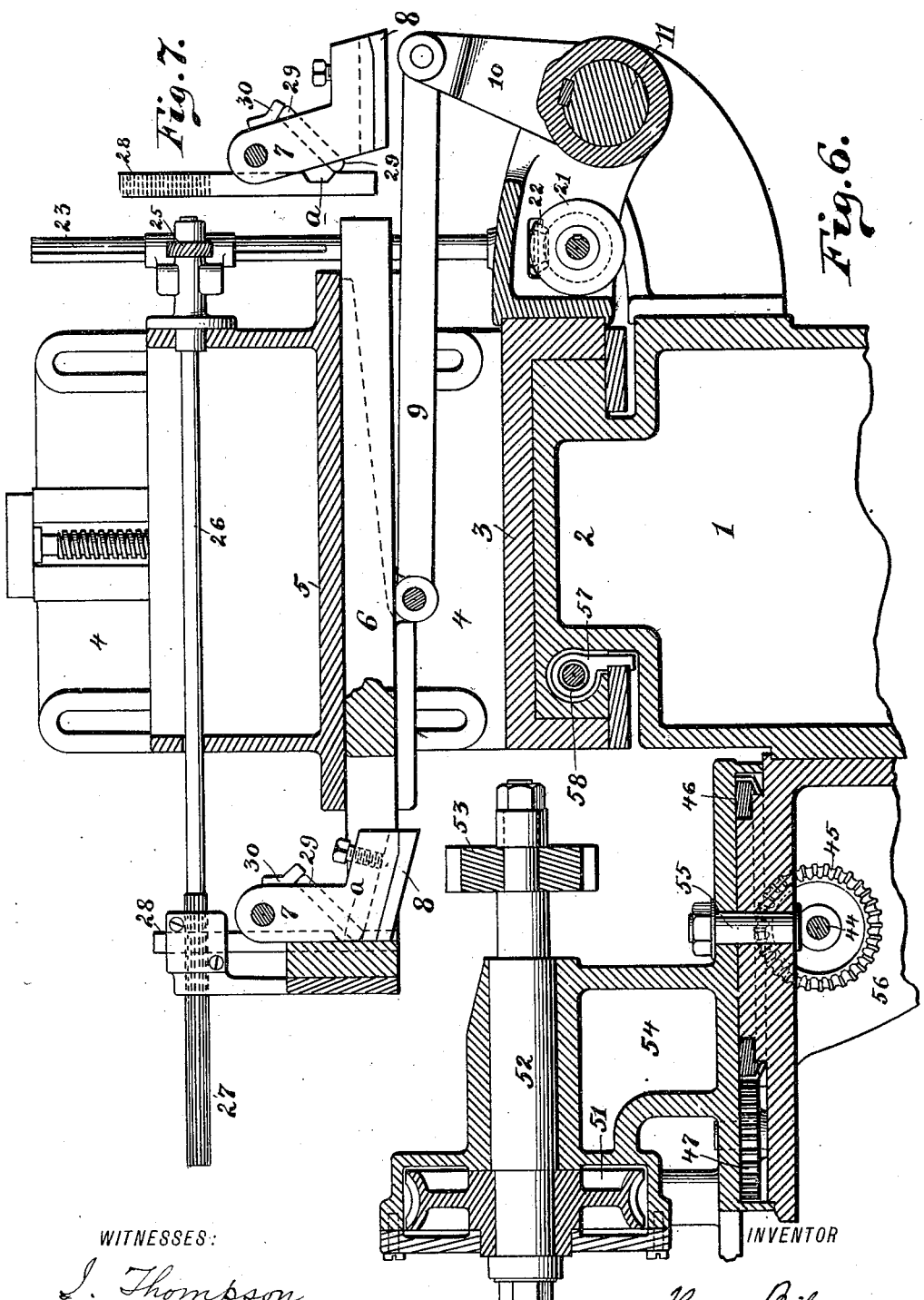

No. 656,166. Patented Aug. 21, 1900.
H. BILGRAM.
MACHINE FOR CUTTING TEETH OF GEARED WHEELS.
(Application filed Dec. 27, 1898.)
(No Model.)
5 Sheets—Sheet 5.
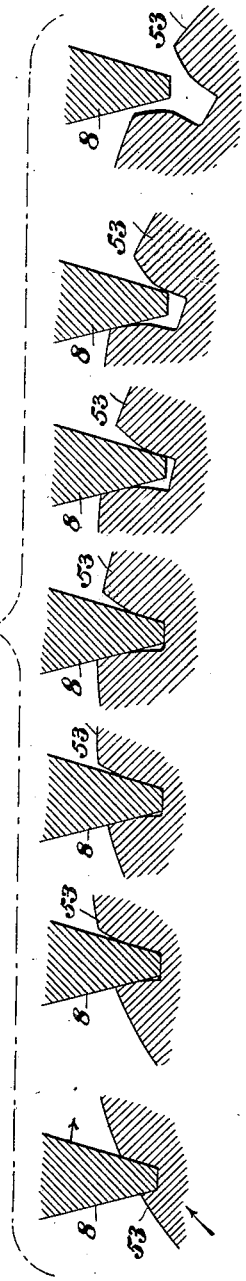
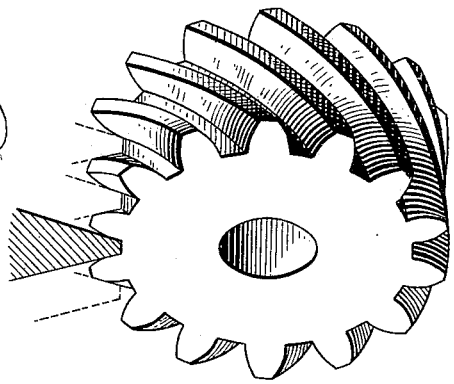
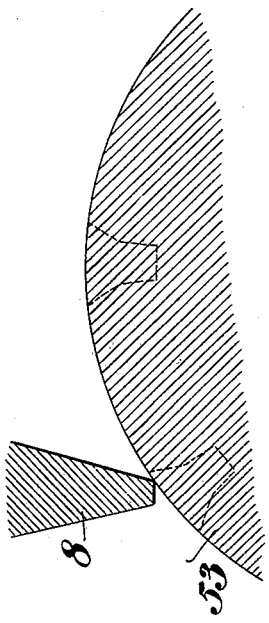
Witnesses:
Inventor:
Hugo Bilgram

UNITED STATES PATENT OFFICE.

HUGO BILGRAM, OF PHILADELPHIA, PENNSYLVANIA.

MACHINE FOR CUTTING TEETH OF GEARED WHEELS.

SPECIFICATION forming part of Letters Patent No. 656,166, dated August 21, 1900.

Application filed December 27, 1898. Serial No. 700,311. (No model.)

*To all whom it may concern:*

Be it known that I, HUGO BILGRAM, of the city and county of Philadelphia, in the State of Pennsylvania, have invented a new and useful Improvement in Machines for Cutting the Teeth of Geared Wheels, of which the following is a specification.

The invention is based on the principle described as the "principle of evolution" in the specification of Letters Patent No. 294,844, granted to me March 11, 1884, said principle being applied in the present invention to the cutting of spur-gears and spiral gears. This principle may be briefly restated as follows: Any number of gear-wheels which correctly gear with a rack having teeth the shape of a truncated V will correctly gear with one another. Hence by employing a reciprocating tool having the form of a truncated V and rolling on it a gear-wheel on its pitch-line the reciprocating tool will cut teeth of a shape to correctly gear with any other wheel of the same pitch the teeth of which are cut in the same manner and with the same tool.

The novelty of the present invention consists principally in the making of the machine automatic by spacing the wheel to be cut through the space of one tooth after every cut of the tool while the feeding movement of the tool is slowly progressing.

Figure 1:
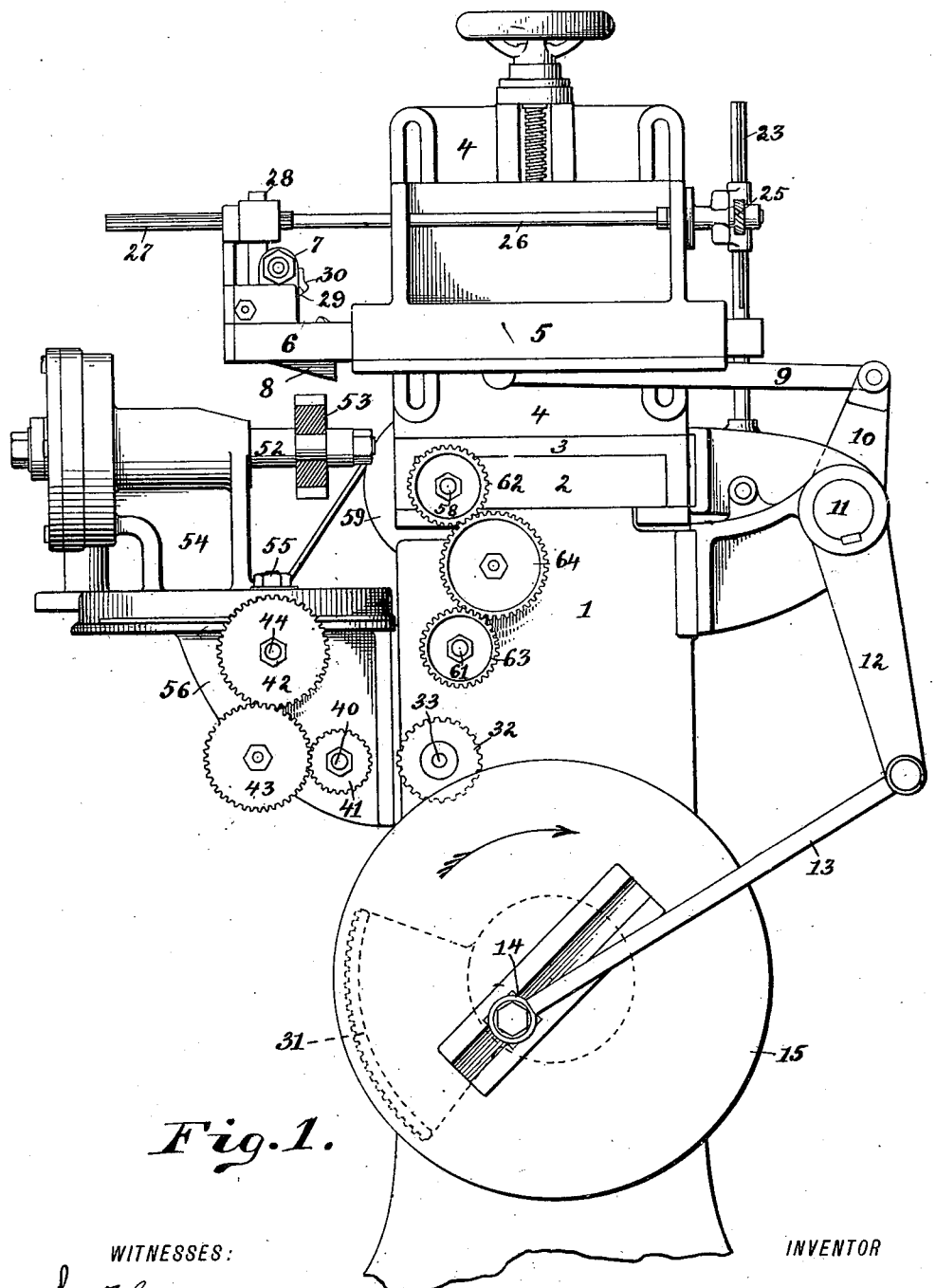
Figure 2:
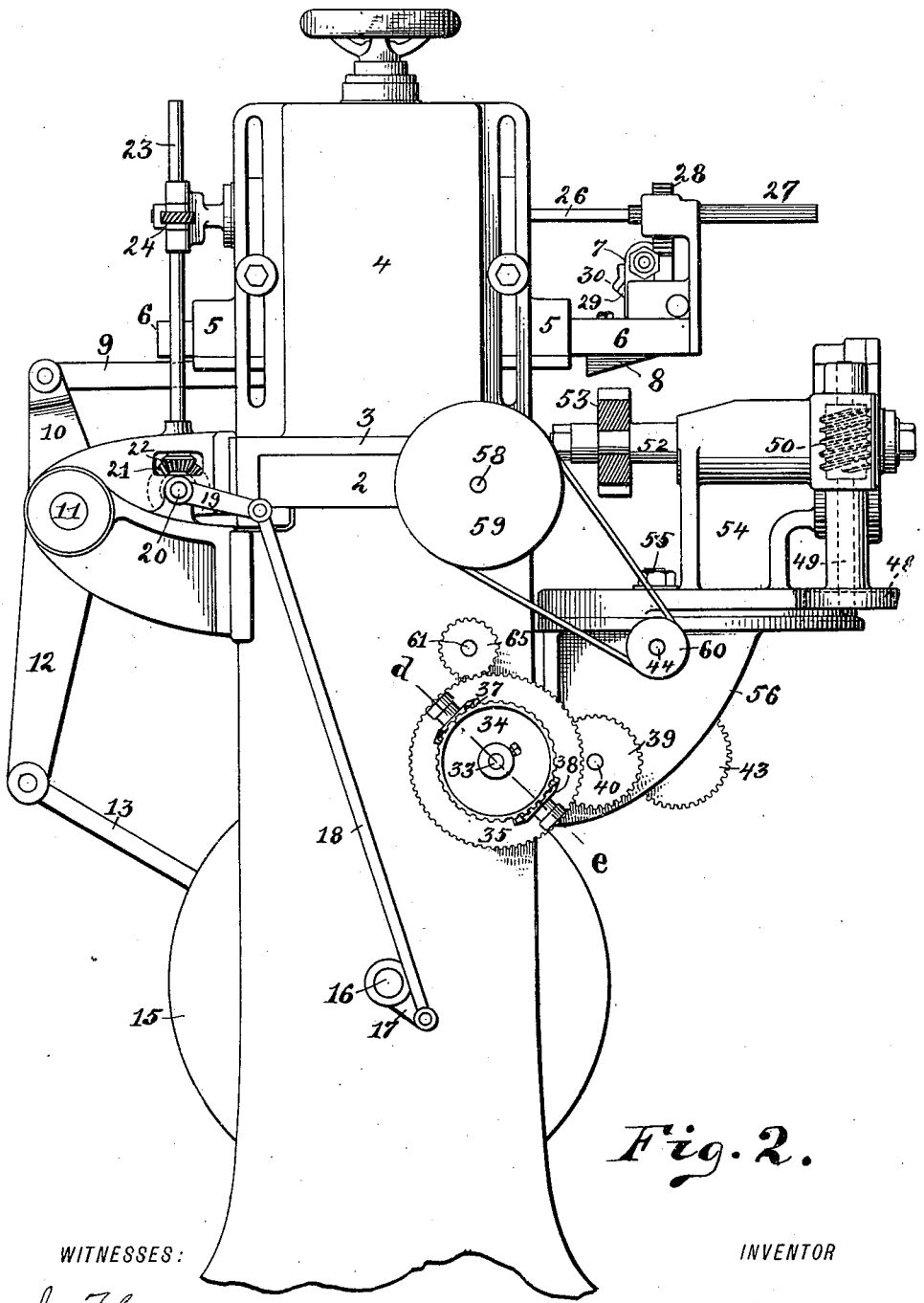

In the accompanying drawings, forming a part of this specification, and in which similar characters of reference indicate similar parts throughout the several views, Figure 1 is an elevation of one side of a gear-cutting machine embodying my improvements; Fig. 2, an elevation of the opposite side of the machine; Fig. 3, a top view or plan of the machine; Fig. 4, a top view of part of the machine, showing the blank-stand placed at an angle with the line of motion of the cutting-tool in order to cut a spiral gear-wheel. In this figure the cutting-tool and its carrying parts are not shown. The line *b c* indicates the direction in which the cutter moves. Fig. 5 is a section on line *d e*, Fig. 2, through the compound wheel 36 and the wheels 34, 35, 37, and 38; Fig. 6, an enlarged section through the machine on line *f g*, Fig. 3; Fig. 7, a detached view of the tool and tool-holder, showing their position when raised on the return or nonoperative stroke; Fig. 8, a diagrammatic view showing the several positions of the tool during the operation of forming one complete cut through one space of the blank; Fig. 9, a diagram showing the relative positions of tool and blank when the former is properly adjusted to commence its work; Fig. 10, a diagram showing the relative position of the tool and the blank in cutting a spiral gear.

The drawings, it will be understood, are for purposes of illustration only. The machine therein shown may be much modified without departing from the spirit of my invention.

The mechanism may be divided into three principal divisions—namely, the "Cutting mechanism," including the tool-lifter, the "Spacing mechanism," and the "Feeding mechanism."

*The cutting mechanism.*—The upper portion 2 of the body 1 of the machine is of prismatic form and carries the cross-slide 3, bearing the upright 4, to which is secured vertically adjustable the ram-bed 5, in which the ram 6 is supported. The front end of the ram carries the apron 7, to which is secured the tool 8, having a cutting profile of the shape of a truncated V, as best shown in Figs. 8 and 9, the tool being located to cut on a pull instead of a push, as is the common practice in shaping-machines. The tool 8 receives a reciprocating movement, which I shall term the "cutting" movement, as follows: By the connecting-rod 9, Figs. 1, 2, 3, and 6, the ram 6 is connected to the lever 10, secured by feathers to the rock-shaft 11, which receives a rocking movement through the lever 12, the connecting-rod 13, and the adjustable crank 14 from the belt-pulley 15. The lever 10 is adapted, by means of feathers, to slide along the rock-shaft 11, for the purpose of following the "feed movement" of the tool, which will be described later. On its return stroke the tool is raised from the work sufficiently to permit the intermittent rotating or spacing of the blank-wheel in the process of cutting by the following device: To the shaft 16 of the belt-pulley 15 (see Figs. 2 and 3) is fastened the crank 17, which is joined by the connecting-rod 18 through the rock-lever 19 to the rock-shaft 20. Splined to this shaft is the bevel-wheel 21, gearing into the bevel-pinion 22, carried on a vertical rock-shaft 23. Splined to this shaft 23 is the spiral wheel 24, gearing into the spiral wheel 25, carried on a shaft 26. The end of shaft 26 carries the long pinion 27, which gears into the rack 28. This rack 28 has its bearings in the ram 6, and in partaking of the reciprocating movement of this ram its teeth slide lengthwise in the teeth of the long pinion 27. As the shaft 16 is rotated by the belt-pulley 15 a reciprocating movement is transmitted through the train just described to the rack 28. By reason of the cam-shaped profile a of the lower end of the rack 28, Figs. 6 and 7, a reciprocating movement is transmitted to the strut 29, the upper end of which impinges on the lug 30, attached to the apron 7, thus alternately raising and lowering the tool. The crank 17 is so located on the shaft 16 that the tool will be elevated at the end of each stroke and lowered at the beginning of the next, remaining lowered during the forward stroke and raised during the return stroke.

*The spacing mechanism.*—After every forward stroke of the tool and during its return stroke the wheel in process of cutting is spaced—namely, rotated through the space of one tooth or more—so as to present to the cutting-tool that portion of the blank into which another, preferably the adjacent, tooth-space is to be cut, which movement I will hereinafter term the "spacing" movement. This movement is effected by the following mechanism: Secured to the belt-pulley 15 is a toothed sector 31, Figs. 1 and 3, which gears into the gear-wheel 32, the angle of the sector 31 being adapted to impart to the wheel 32 one complete rotation while in gear, leaving it stationary during the remainder of the rotation of the belt-pulley. The said gear-wheel 32 is secured to one end of the shaft 33, the other end of which carries the bevel-wheel 34, Figs. 2, 3, and 5. On the shaft 33 are also rotatably carried the spur-wheel 35 and the compound wheel 36. (See Figs. 2 and 5.) The spur-wheel 35 carries in its web the bevel-pinions 37 and 38, which are in gear with the bevel-wheel 34 and the compound wheel 36. While the wheel 35 is held stationary, the intermittent rotation which the bevel-wheel 34 receives through its shaft 33 from the gear-wheel 32 is transmitted through the bevel-pinions 37 and 38 to the compound wheel 36. The rotation of this gear is further transmitted through the spur-wheel 39, shaft 40, Figs. 1 and 3, change-wheels 41 and 42, and connecting-idler 43, Figs. 1 and 3, shaft 44, and bevel-pinion 45, compound gear-ring 46, idler 47, Fig. 6, spur-gear 48, worm-shaft 49, and worm 50 to the worm-wheel 51, Figs. 2 and 6, which is secured to the blank-arbor 52, said arbor carrying the blank 53, which is in process of cutting. The said idler 43 is adjustably secured to the body of the machine by means well known in the arts, but not shown in the drawings. The compound gear 46 is shown in section and the idler 47 in view in Fig. 6. The wheels 46, 47, and 48 are shown in Fig. 4 by dotted circles representing their pitch-lines.

The blank-arbor 52 is rotatably supported by the blank-stand 54, which is bolted, by means of the bolt 55, adjustable concentrically with the compound gear-ring 46, to the angle-plate 56, which is rigidly bolted to the body of the machine. The change-wheels 41 and 42 are selected, so that one entire rotation of the gear-wheel 32 will rotate the blank 53 through the space of one tooth. Their selection therefore depends on the number of teeth required to be cut in the blank.

For cutting spiral gears the blank-stand 54 is set so that the arbor 52 forms the desired angle with the line in which the tool 8 moves, as shown in Fig. 4.

*The feeding mechanism.*—In embodying in this machine the principle of evolution, I prefer in this case to employ an inversion of the process described in my Patent No. 294,844. Instead of giving the blank to be cut the double motion of rotation and translation, which are the component parts of a rolling motion, I impart to the tool the motion of translation and to the wheel the motion of rotation, so, however, that the relative movement between the tool and the wheel remains the same—namely, the movement of a wheel rolling in a rack. Fig. 8 represents the successive positions of the tool in relation to the blank.

The tool receives a feed movement at right angles to its cutting movement, as follows: The ram-bed 5 is secured through the upright 4 to the cross-slide 3. To this slide is fastened the nut 57 of the traverse-screw 58, Fig. 6. This screw is slowly rotated by means of the belt-pulleys 59 and 60, Figs. 1, 2, and 3, the latter being secured to the shaft 44, which is rotated, as heretofore described.

The blank-arbor 52 obtains the corresponding rotary movement as follows: The traverse-screw 58 is geared to the shaft 61 by means of the change-wheels 62 and 63 and intermediate idler 64, Fig. 1, the latter being adjustably secured to the body of the machine by means well known in the arts, but not shown in the drawings. The shaft 61 carries on one of its ends the pinion 65, meshing with the gear-wheel 35, Fig. 2. Assuming the bevel-wheel 34 to be stationary, the rotation of the gear-wheel 35, which carries the bevel-pinions 37 and 38, will through these pinions cause the compound wheel 36 to rotate. (See Fig. 5.) This rotation is transmitted to the blank in process of cutting by the train of gear-wheels heretofore described. The change-wheels 62 and 63 are selected, so as to make the described rotation of the blank 53 correspond with the feeding movement of the tool. They determine the pitch of the wheel to be cut.

In describing the effect of the intermittent rotation of the bevel-wheel 34 I had assumed the gear-wheel 35 to be stationary, and in describing the effect of the rotation of the pinion 65 the bevel-wheel 34 was assumed to be stationary. As both the bevel-wheel 34 and the pinion 65 are rotated simultaneously, the motion actually transmitted to the blank 53 is compounded of the two movements described as the "spacing" and the "feeding" movements. The rotation of the blank 53 during each return stroke of the tool will therefore be slightly different from the true spacing movement, the difference corresponding to the feed movement of the tool 8.

*Operation of the machine.*—When it is desired to cut a wheel, the blank 53 is secured to the blank-arbor 52, the altitude of the tool is adjusted to the depth of the desired tooth-spaces, and the cross-slide 3 is so adjusted that the tool will just come in contact with the periphery of the blank, as indicated in Fig. 9. On starting the belt-pulley 15 the ram 6, and with it the tool 8, will receive the cutting movement, as described. During each return stroke of the tool the spacing mechanism is brought into operation, so that at each subsequent stroke the tool will come in contact with that part of the blank 53 into which the adjoining tooth is to be cut. The feeding movement will also slowly progress, so that each succeeding cut will be slightly deeper than the preceding one, and when the blank 53 has made one revolution and the tool has made its first cut into each of the desired tooth-spaces the feed movement will have advanced sufficiently to make a second and somewhat-deeper cut into the first space. This process will continue, one cut being made through each tooth-space for each complete revolution of the blank 53 and each succeeding cut being deeper than the preceding cut until the tool will cease cutting, having passed through the several positions indicated in Fig. 8. In cutting a spiral wheel the blank-stand 54 is placed in a position indicated by Fig. 4, the angle being adapted to the angle of the teeth of the spiral wheel. In every other respect the process of cutting is the same as that described. It will be noticed that the blank of the spiral wheel in process of cutting remains stationary during the time of actual cutting—namely, the forward stroke of the tool—and partakes of the compound movement of the spacing and feeding mechanism during the return stroke of the tool.

*The theory of the machine.*—As stated at the beginning, the operation of the machine is based on the fact that any number of gear-wheels gearing correctly with a rack the teeth of which have the shape of a truncated V will correctly gear with one another. In the described machine the process of cutting consists, virtually, in forcing a rack of the described form into the blank. In its reciprocating motion the tool generates such a rack-tooth, which forces itself into the blank by a cutting process. Ignoring the spacing movement, the lateral movement of the tool, considered in conjunction with the corresponding feeding movement of the blank as produced by the feeding mechanism, is identical with that of a rack gearing into a wheel. A single tooth-space would thus be produced by permitting the tool to pass through all the phases indicated in Fig. 8; but owing to the operation of the spacing mechanism not only one but all tooth-spaces of the wheel are consecutively subjected to each operation of this process.

In cutting spur-gears the tool penetrates into each space precisely as a rack-tooth would enter the tooth-space of a spur-wheel. The corner of the tool will enter along the entire face, plowing its way deeper with each stroke until the tool ceases cutting, the imaginary rack-tooth having passed through all its meshing phases.

If a rack meshes with a spiral wheel, any one tooth of this rack will enter not along the entire face, but at one end of the face or at the end section of the spiral wheel, and while moving deeper at this section will enter at the next adjoining section, and so on. When in deepest gear at the first section, it will not have reached the same depth at any other section and may not even have begun to enter at the extreme section; but as the motion of the rack proceeds the tooth will ultimately pass into and out of every part of the space.

When the blank-stand 54 is placed at an angle, as shown in Fig. 4, the generating rack-tooth, represented by the reciprocating tool, will be in the relative position of a rack-tooth gearing with a spiral wheel, and it will plow its way into the blank precisely as the tooth of the imaginary rack would enter in successive phases the corresponding tooth-space, beginning at one corner and removing the metal, each succeeding cut making room for the next adjacent phase of the meshing rack-tooth. If this process is continued while both the spacing mechanism and the feeding mechanism remain in operation until the tool ceases cutting, the imaginary rack-tooth will have passed through all its phases of meshing, and a spiral wheel, or, more correctly speaking, a wheel with helicoidal teeth, will be the result.

In Fig. 10 a spiral wheel is shown and in relation to it the tool in four different stages of the process of cutting the same. The first (dotted) position of the tool indicates the stage shortly after the beginning of the process. The second position (shown in full lines) represents that position at which the tool is penetrating to the full depth of the tooth at the front section of the wheel without having entered at the far section. The third position shows the tool cutting to the full depth of the tooth in the middle section of the wheel, while the fourth position shows the tool as it enters to the full depth of the tooth at the far section of the wheel. As the tool passes gradually from one to the next position it assumes a sufficient number of intermediate positions to produce a practically-uninterrupted curvature of the sides of the teeth.

I claim—

1. In a machine for cutting gear-wheels, in combination, a tool adapted to cut intermittently, an arbor adapted to hold the blank to be cut, means for intermittently imparting a spacing movement to the said arbor during the interval between two cuts of said tool and a feeding mechanism controlling the relative position of the tool and the blank to be cut.

2. In a machine for cutting gear-wheels, in combination, a tool, means for imparting to the said tool a reciprocating cutting movement, an arbor adapted to hold the blank to be cut, means for intermittently imparting a spacing movement to the said arbor simultaneously with the return stroke of the tool and a feeding mechanism controlling the relative position of the tool and the blank to be cut.

3. In a machine for cutting gear-wheels, in combination, a tool, means for imparting to the said tool a reciprocating cutting movement, means for lifting the tool, during its return stroke, clear of the teeth of the wheel to be cut, an arbor adapted to hold the blank to be cut, means for intermittently imparting a spacing movement to the said arbor simultaneously with the return stroke of the tool and a feeding mechanism controlling the relative position of the tool and the blank to be cut.

4. In a machine for cutting gear-wheels, in combination, a tool, means for imparting to said tool a reciprocating cutting movement, means for lifting the tool, during its return stroke, clear of the teeth of the wheel to be cut, an arbor adapted to hold the blank to be cut and to be set at an angle with the line of the cutting movement of the tool, means for intermittently imparting a spacing movement to the said arbor simultaneously with the return stroke of the tool and a feeding mechanism controlling the relative position of the tool and the blank to be cut.

5. In a machine for cutting gear-wheels, in combination, a tool, means for imparting to the said tool a reciprocating cutting movement, means for imparting to the said tool a feed movement approximately at right angles to the cutting movement, an arbor adapted to hold the blank to be cut, and means for intermittently imparting to the said arbor, during the return stroke of the tool, a spacing movement which shall slightly differ from the exact distance between the teeth to be cut in the blank, said difference corresponding to the feed movement of the tool.

6. In a machine for cutting gear-wheels, in combination, a tool, means for imparting to said tool a reciprocating cutting movement, means for imparting to said tool a feed movement approximately at right angles to the cutting movement, means for lifting the said tool, during its return stroke, clear of the teeth of the wheel to be cut, an arbor adapted to hold the blank to be cut, and means for intermittently imparting to said arbor, during the return stroke of the tool, a spacing movement which shall slightly differ from the exact distance between the teeth to be cut in the blank, said difference corresponding to the feed movement of the tool.

7. In a machine for cutting gear-wheels, in combination, a tool, means for imparting to the said tool a reciprocating cutting movement, means for imparting to the said tool a feed movement approximately at right angles to the cutting movement, and means for lifting the said tool, during its return stroke, clear of the teeth of the wheel to be cut, an arbor adapted to hold the blank to be cut and to be set at an angle with the line of the cutting movement of the tool, and means for intermittently imparting to the said arbor, during the return stroke of the tool, a spacing movement which shall slightly differ from the exact distance between the teeth to be cut, said difference to correspond to the feed movement of the tool.

8. In a machine for cutting spiral gears, in combination, a tool, means for imparting to the said tool a reciprocating cutting movement, means for imparting to the said tool a feed movement approximately at right angles to the cutting movement, an arbor adapted to hold the blank to be cut and to be set at an angle with the line of cutting movement of the tool, and means for imparting to the said arbor a feed movement corresponding to the feed movement of the tool.

HUGO BILGRAM.

Witnesses:
I. THOMPSON,
THOS. M. IRVING.